United States Patent
Chasdai et al.

(10) Patent No.: US 12,107,744 B2
(45) Date of Patent: Oct. 1, 2024

(54) CYCLE-BASED PER-FLOW PACKET DROP COUNTING

(71) Applicant: Mellanox Technologies Ltd., Yokneam (IL)

(72) Inventors: Yair Chasdai, Yokneam (IL); Alon Riesenberg, Yokneam (IL); Noam Rahoum, Yokneam (IL); Ido Zemah, Yokneam (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 211 days.

(21) Appl. No.: 17/742,454

(22) Filed: May 12, 2022

(65) Prior Publication Data

US 2023/0370352 A1    Nov. 16, 2023

(51) Int. Cl.
H04L 43/0829    (2022.01)
(52) U.S. Cl.
CPC ............... H04L 43/0835 (2013.01)
(58) Field of Classification Search
CPC ... H04L 43/0835; H04L 43/06; H04L 43/028; H04L 43/0829; H04L 43/106; H04L 43/026
See application file for complete search history.

(56) References Cited

U.S. PATENT DOCUMENTS

| | | | |
|---|---|---|---|
| 10,834,006 B2 | 11/2020 | Levy et al. | |
| 10,997,007 B2 | 5/2021 | Rotem et al. | |
| 11,500,737 B2 | 11/2022 | Aibester et al. | |
| 11,570,118 B2 | 1/2023 | Levy et al. | |
| 2013/0136127 A1* | 5/2013 | Hill | H04L 45/74 370/392 |
| 2021/0153064 A1* | 5/2021 | Huang | H04W 24/10 |

(Continued)

FOREIGN PATENT DOCUMENTS

WO    WO-2017203421 A1 * 11/2017 ......... H04L 43/0805

OTHER PUBLICATIONS

Cisco Systems, "Access Control Lists and IP Fragments", pp. 1-9, Document ID: 8014, Aug. 10, 2005, as downloaded from https://www.cisco.com/c/en/us/support/docs/ip/generic-routing-encapsulation-gre/8014-acl-wp.pdf.

(Continued)

*Primary Examiner* — Charles C Jiang
*Assistant Examiner* — Rachel Elizabeth Marks
(74) *Attorney, Agent, or Firm* — MEITAR PATENTS LTD.

(57) ABSTRACT

A system for cycle-based per-flow packet drop counting. The system comprises a communication network which interconnects nodes including receiver/s, supervisor/s, and sender/s. The sender sends flow/s of packets, via link/s, to the receiver/s. Flow/s are divided into cycles whose lengths are known to sender, receiver and supervisor. The sender adds to each packet indications of: a cycle during which the packet was sent, and whether the packet belongs to a given flow for which packet drops are being counted. The sender reports to the supervisor a number of packets sent during the individual cycle. The receiver reports to the supervisor, by counting indications, for the individual flow, how many packets, sent during the individual cycle, were received. The supervisor computes a difference between the number of packets sent and received, and, for certain difference value/s, implements further action/s.

14 Claims, 5 Drawing Sheets

(56) References Cited

U.S. PATENT DOCUMENTS

2021/0306166 A1   9/2021   Piasetsky et al.
2023/0114898 A1*  4/2023   Kamisetty ........... H04L 47/2441
                                                        370/235

OTHER PUBLICATIONS

Olofsson, S., "Building and Using Policies with Cisco SD-WAN", pp. 1-139, Cisco live, DGTL-BRKRST-2791, Jun. 2-3, 2020.

Cisco, "Default Service Configuration Reference Tables", Cisco Service Control Application for Broadband Reference Guide, Chapter 1, pp. 1-40, Mar. 10, 2009, as downloaded from https://www.cisco.com/en/US/docs/cable/serv_exch/serv_control/broadband_app/rel315/bbrg/01_SCA_BB_RG_3.1.5.pdf.

Wikipedia, "Hardware performance counter", pp. 1-3, last edited Nov. 17, 2022, as downloaded from https://en.wikipedia.org/wiki/Hardware_performance_counter.

Cao et al., "P4 to FPGA—A Fast Approach for Generating Efficient Network Processes", IEEE Access, vol. 8, pp. 23440-23456, Jan. 30, 2020.

Karaagac et al., "Alternate Marking-based Network Telemetry for Industrial WSNs", IEEE International Conference on Factory Communication Systems, pp. 1-8, Portugal, Apr. 27-29, 2020.

Fioccola et al., "Alternate-marking method for passive and hybrid performance monitoring", RFC8321, pp. 1-33, Jan. 2018.

Mellanox, "What Just Happened™ (WJH) Telemetry", pp. 1-4, year 2020, as downloaded from https://network.nvidia.com/files/doc-2020/sb-mellanox-wjh.pdf.

Mellanox, "SwitchX®-2 Ethernet Optimized for SDN", pp. 1-2, year 2013, as downloaded from https://network.nvidia.com/files/doc-2020/switchx-2-en-sdn.pdf.

Riesenberg et al., "Time-multiplexed parsing in marking-based network telemetry", Proceedings of ACM International Conference on Systems and Storage, pp. 1-8, year 2019.

Fioccola, Giuseppe, et al. "Alternate-marking method for passive and hybrid performance monitoring". No. rfc8321. 2018.

A. Karaagac, E. De Poorter and J. Hoebeke, "Alternate Marking-based Network Telemetry for Industrial WSNs," 2020 16th IEEE International Conference on Factory Communication Systems (WFCS), Porto, Portugal, 2020 pp. 1-8, doi: 10.1109/WFCS47810.2020.9114490.

Riesenberg, Alon, et al. Time-multiplexed parsing in marking-based network telemetry. In: Proceedings of the 12th ACM International Conference on Systems and Storage. 2019. p. 80-85.

Mellanox's "What Just Happened Tm (WJH) telemetry"—mellanox.com/files/doc-2020/sb-mellanox-wjh.pdf.

SwitchX®-2 Ethernet Optimized for SDN—https://network.nvidia.com/sites/default/files/doc-2020/switchx-2-en-sdn.pdf.

Access Control Lists and IP Fragments—cisco.com/c/en/us/support/docs/ip/generic-routing-encapsulation-gre/8014-acl-wp.html. Aug. 10, 2005.

Default Service Configuration Reference Tables—https://www.cisco.com/en/US/docs/cable/serv_exch/serv_control/broadban d_app/rel315/bbrg/01_SCA_BB_RG_3.1.5.pdf.

Z. Cao, H. Su, Q. Yang, J. Shen, M. Wen and C. Zhang, "P4 to FPGA—A Fast Approach for Generating Efficient Network Processors," in IEEE Access, vol. 8, pp. 23440-23456, 2020, doi: 10.1109/ACCESS.2020.2970683.

Building and Using Policies with Cisco SD-WAN—https://www.ciscolive.com/c/dam/r/ciscolive/us/docs/2020/pdf/DGTL-BRKRST-2791.pdf. Jun. 3-4, 2020.

Hardware performance counter, Wikipedia—https://en.wikipedia.org/wiki/Hardware_performance_counter.

Mellanox Technologies, "Mellanox Adapters Programmer's Reference Manual (PRM)—Supporting ConnectX®-4 and ConnectX® 4 Lx," Rev. 0.40, pp. 1-316, year 2016, as downloaded from https://network.nvidia.com/files/doc-2020/ethernet-adapters-programming-manual.pdf.

Mellanox Technologies, "Nvidia Mellanox SPECTRUM-2—400G Ethernet Switch Silicon," pp. 1-2, year 2020, as downloaded from https://network.nvidia.com/files/doc-2020/pb-spectrum-2.pdf.

Tumer et al., "Energy-Efficient and Fast Date Gathering Protocols for Indoor Wireless Sensor Networks," Sensors, Open Access, vol. 10, pp. 8054-8069, year 2010, as downloaded from researchgate.net/publication/338926337_P4_to_FPGA_-_A_Fast_Approach_for_Generating_Efficient_Network_Processors.

* cited by examiner

CYCLE-BASED PER-FLOW PACKET DROP COUNTING

FIELD

This invention relates generally to communication networks, and more specifically to packet-based communication networks.

BACKGROUND

An "alternate-marking method for passive and hybrid performance monitoring" is described online at datatracker.ietf.org/doc/html/rfc8321.

A method for "alternate marking-based network telemetry for industrial WSNs" is described online at biblio.ugent.be/publication/8662310/file/8671359.

"Time-multiplexed parsing in marking-based network telemetry" is described at_arxiv.org/pdf/1808.04559v1.pdf.

Mellanox's "What Just Happened™ (WJH) telemetry" is described online at mellanox.com/files/doc-2020/sb-mellanox-wjh.pdf.

SUMMARY OF THE DISCLOSURE

Certain embodiments seek to quantify or measure packet drop or packet loss, e.g., in live network traffic.

Certain embodiments seek to improve network performance monitoring abilities of a given network service provider such as an ISP (Internet Service Provider).

Certain embodiments seek to provide tools for continuously monitoring network devices and network services.

Certain embodiments seek to provide a system which provides loss telemetry data efficiently, to a network administrator or supervisor.

Certain embodiments seek to provide a system which is parsimonious in terms of the number of HW counters required per telemetry information provided.

Certain embodiments seek to provide a system which is parsimonious in terms of the number of dedicated packets required, e.g., typically just a few packets once per cycle. Certain embodiments seek to provide a system which measures packet loss for a given flow, e.g., a flow selected by a network administrator, typically using only a single bit from the original packet, thus providing telemetry which is efficient in that only very minor overhead is required.

Embodiments Include:

Embodiment 1. A system for cycle-based per-flow packet drop counting, the system comprising: a communication network which interconnects plural nodes, the plural nodes including at least one receiver, at least one supervisor, and at least one sender; wherein the sender is operative to send at least one individual flow of packets, via at least one link, to the at least one receiver, and wherein the individual flow is divided into cycles whose lengths are known to the sender, to the receiver and to the supervisor, wherein the sender adds to each packet an indication of a cycle, from among the cycles, during which the packet was sent, and an indication of whether or not the packet belongs to a given flow for which packet drops are to be counted; and wherein, for at least the given flow, the sender reports to the supervisor a number of packets sent during the individual cycle, the receiver reports to the supervisor, by counting the indications, for at least the individual flow, how many packets, sent during the individual cycle, were received, thereby to define a number of packets received, and the supervisor computes a difference between the number of packets sent and the number of packets received, and, for at least some values of the difference, implements at least one further action.

Embodiment 2. The system according to any preceding embodiment wherein each packet has a header, and wherein each the indication comprises at least one bit added to each packet's header.

Embodiment 3. The system according to any preceding embodiment wherein the indication comprises a single bit which toggles between 0 and 1 for packets sent in sequential cycles, such that the single bit is assigned, by the sender, a first value known to the sender, receiver and supervisor, from among 0 and 1, for each packet sent during each odd-numbered cycle, and a second value, from among 0 and 1, which is known to the sender, receiver and supervisor, for each packet sent during an even-numbered cycle, such that the indication, on each packet P, thus indicates whether packet P was sent during an odd-numbered cycle, or during an even-numbered cycle.

Embodiment 4. The system according to any preceding embodiment wherein, for at least one receiver R, which communicates with the sender via a link L, the sender maintains a first counter per each given flow between the sender and receiver R, and each the first counter maintained by the sender counts all bits with the first value for an individual flow from among at least one flow/s over the link L.

Embodiment 5. The system according to any preceding embodiment wherein the sender also maintains a second counter per flow between the sender and receiver R, and wherein the second counter counts all bits with the second value for the individual flow.

Embodiment 6. The system according to any preceding embodiment wherein, at least once per cycle C, and for each given flow F from among at least one flow over each of at least one link between the sender and the at least one receiver, the sender informs the supervisor how many bits were counted by a counter X, from among the sender's first and second counters, wherein the counter X is not being used to count packets being sent by the sender in cycle C, thereby to indicate, to the supervisor, how many packets were sent by the sender, within flow F, in a previous cycle C−1, and the sender then zeroes the counter X, thereby to ready the counter X to count packets which will be sent, within flow F, during cycle C+1.

Embodiment 7. The system according to any preceding embodiment wherein the sender informs the supervisor how many bits were counted by the counter X at a point in time in cycle C.

Embodiment 8. The system according to any preceding embodiment wherein the at least one receiver is operative to receive either all, or, if some packets have been dropped, less than all, of packets sent via a given link between the at least one receiver and the sender, and wherein the receiver maintains a first counter per each given flow, between each of the at least one sender and the at least one receiver; and each the first counter maintained by the receiver, per each given individual flow, counts all bits with the first value for the given individual flow.

Embodiment 9. The system according to any preceding embodiment wherein the at least one receiver also maintains a second counter per each given flow between the at least one sender and the at least one receiver, and wherein the second counter counts all bits with the second value for a given individual flow.

Embodiment 10. The system according to any preceding embodiment wherein, at least once per cycle C and for each given flow F from among at least one flow over each of at least one link between the receiver and at least one sender/s, the receiver informs the supervisor how many bits were counted by a counter Y, from among the receiver's first and second counters, wherein the counter Y is not being used to count packets being received by the receiver in cycle C, thereby to indicate, to the supervisor, how many packets within flow F, were received by the receiver, in a previous cycle C−1, and the receiver then zeroes the counter Y, thereby to ready the counter Y to count packets which will be received, within flow F, during cycle C+1.

Embodiment 11. The system according to any preceding embodiment wherein the at least one supervisor is operative to receive indications, from the sender, of how many bits were counted in packets the sender sent, as well as indications from the receiver, of how many bits were counted in packets the receiver received.

Embodiment 12. The system according to any preceding embodiment wherein indications from the sender are matched with indications from the receiver by matching times associated with the indications from the sender, which are time-stamped, with times associated with the indications from the receiver, which are also time-stamped.

Embodiment 13. The system according to any preceding embodiment wherein the indications received by the supervisor from at least one of the sender and the receiver, include a time-stamp applied by the supervisor, thereby to record time of receipt of the indications.

Embodiment 14. The system according to any preceding embodiment wherein the indications received by the supervisor from at least one of the sender and the receiver include a time-stamp applied by at least one of the sender and the receiver, thereby to record a time at which the indications were sent to the supervisor by at least one of the sender and the receiver.

Embodiment 15. The system according to any preceding embodiment wherein the network includes at least one node which functions both as the supervisor and as the receiver.

Embodiment 16. The system according to any preceding embodiment wherein each node N in the network functions both as a sender and as a receiver and is operative, both to add to each packet sent, the indication of a cycle, from among the cycles, during which the packet was sent, and, for at least the individual flow, to report to the supervisor the number of packets sent during the individual cycle, and, to report to the supervisor, by counting indications, for at least one individual flow from another node to node N, how many packets, sent during the individual cycle, were received by node N.

Embodiment 17. The system according to any preceding embodiment wherein the supervisor is controlled to compute the difference, and to implement the further action, by software residing in the supervisor.

Embodiment 18. The system according to any preceding embodiment wherein the sender includes hardware configured to add the indication and to report to the supervisor, and wherein the hardware is controlled by firmware residing in the sender.

Embodiment 19. The system according to any preceding embodiment wherein the receiver includes hardware configured to count the indications.

Embodiment 20. The system according to any preceding embodiment wherein the at least one further action comprises generating a notification to at least one customer of the communication network.

Embodiment 21. The system according to any preceding embodiment wherein the indication of a cycle comprises bit/s which toggle between, at least, 0 and 1 for packets sent in different cycles, such that the bit/s is assigned, by the sender, a first value known to the sender, receiver and supervisor, for each packet sent during each first cycle in a repeating tuple of cycles, and a second value, also known to the sender, receiver and supervisor, for each packet sent during each second cycle in the repeating tuple of cycles, such that the indication, on each packet P, thus indicates a cycle, within the repeating tuple of cycles, during which packet P was sent.

Embodiment 22. The system according to any preceding embodiment wherein each sender includes a policy engine, which defines the given flow for which packet drops are to be counted, each time a network administrator, or an automatic external input, selects a flow for which packet loss data is desired.

Embodiment 23. The system according to any preceding embodiment wherein each receiver includes a policy engine, which identifies to the receiver, the given flow for which packet drops are to be counted.

Embodiment 24. The system according to any preceding embodiment wherein the point in time is at least half-way through cycle C.

Embodiment 25. The system according to any preceding embodiment wherein the indications received by the at least one supervisor from the sender are time-stamped.

Embodiment 26. The system according to any preceding embodiment wherein the indications, received by the at least one supervisor from the receiver, are time-stamped.

Embodiment 27. The system according to any preceding embodiment wherein the hardware configured to count the indications is controlled by firmware, coherent to the cycles, which resides in the receiver and sends packet data every cycle.

Embodiment 28. A method for cycle-based per-flow packet drop counting in a communication network which interconnects plural nodes, the plural nodes including at least one receiver and at least one sender, the method comprising:

sending, from the sender, at least one individual flow of packets via at least one link to the at least one receiver, wherein the individual flow is divided into cycles whose lengths are known to the sender, to the receiver, and to at least one supervisor in the communication network, and wherein the sender adds to each packet
  an indication of a cycle, from among the cycles, during which the packet was sent, and
  an indication of whether or not the packet belongs to a given flow for which packet drops are to be counted;
reporting to the supervisor a number of packets sent during the individual cycle, for at least the given flow, by counting the indications, reporting to the supervisor how many packets, sent during the individual cycle, were received, for at least the individual flow, thereby to define a number of packets received, and
computing a difference between the number of packets sent and the number of packets received, and, for at least some values of the difference, implementing at least one further action which is not implemented for other values of the difference.

The following terms may be construed either in accordance with any appropriate definition thereof appearing in literature in the relevant field of technology, or in accordance with the specification, or to include in their respective scopes, the following:

IP: Internet protocol
NIC: Network interface card
GPU: Graphics Processing Unit

Flow: given a communication network with plural nodes, "flow" is intended to include any sequence of packets being transmitted between a particular sender (a first one of the nodes) and a particular receiver (a second one of the nodes). It is appreciated that there may be plural (say, 10 or more) layer 2 or layer 3 (say) flows running on a single port.

Network administrator and "supervisor" may be interchanged herein.

"Loss" and "drop" of a packet may be interchanged herein.

"Match-Action-Engine" and "Policy Engine" may be interchanged herein.

DETAILED DESCRIPTION OF CERTAIN EMBODIMENTS

Figure 1:
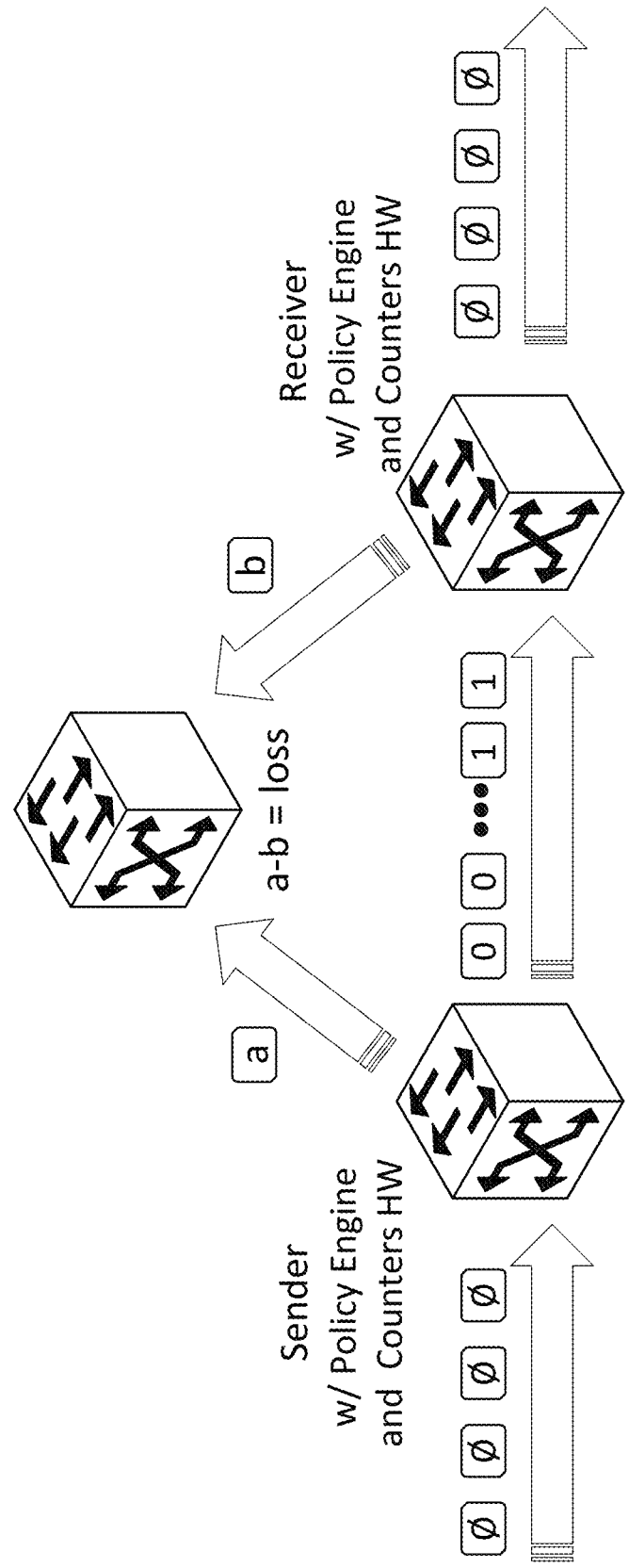
FIG. 1 is a simplified top-level block diagram illustration of a system which provides loss telemetry data according to an embodiment.

Systems which provide loss telemetry data efficiently, to a network administrator or supervisor, including quantification of loss occurring over a given flow, between a given sender and a given receiver, selected by the network administrator e.g., via a suitable user interface, are now described in detail. Each sender and receiver may comprise a router or switch having a policy engine aka Match-Action Engine, and Counters HW e.g., as described in detail herein, and the supervisor may, for example, be based on an X86 family microprocessor.

The policy engine may define a flow and/or "paint" a bit in a packet's header, to indicate a cycle to which the packet belongs. Optionally, SW and/or FW may be used to define or configure a policy on each Match-Action Engine or to define an ACL (access control list) bind to data flows. An action of counting how many packets are sent by each sender, and how many are received by each receiver, in each period (cycle), may effect counting according to a colored bit on the packet header e.g. as described below. This HW counter functionality may be powered by a Global Accounting HW unit such as those found in NBU switches which may implement the sender and receiver (e.g., each sender and each receiver, in combination with a "supervisor" or network administrator node. The supervisor receives counters both from the sender and from the receivers, and, by comparing these (e.g. loss=amount_of_sent−amount_of_receive), detects packet drops "on the fly" (aka OTF). It is appreciated that the embodiments herein are not intended to be limiting. For example, the scope of the invention is intended to include, but is not limited to, any telemetry system which (e.g., as described) uses real time ability in a network device to toggle a bit from '0' to '1' and vice versa in the packet header.

More generally, it is appreciated that the system need not toggle between only 0 and 1. Instead, for example, more (perhaps 2) bits may be used to differentiate between, say, a repeating tuplet of first, second, third and fourth cycles, where each packet sent in a first cycle (e.g. a cycle whose ordinal number divides by 4 with remainder 1), in any tuplet, may have 1 added to its header, each packet sent in a second cycle (e.g. a cycle whose ordinal number divides by 4 with remainder 2), in any tuplet, may have 2 added to its header, each packet sent in a third cycle (e.g. a cycle whose ordinal number divides by 4 with remainder 3), in any tuplet, may have 3 added to its header, and each packet sent in a fourth cycle (e.g. a cycle whose ordinal number divides by 4 with remainder 4), in any tuplet, may have 0 added to its header.

Thus, according to an embodiment, the indication of a cycle added to the header may comprise bit/s which toggle between, at least, 0 and 1 for packets sent in different cycles, such that the bit/s is assigned, by the sender, a first value known to the sender, receiver and supervisor, for each packet sent during each first cycle in a repeating tuple of cycles, and a second value, also known to the sender, receiver and supervisor, for each packet sent during each second cycle in the repeating tuple of cycles, such that the indication, on each packet P, thus indicates a cycle, within the repeating tuple of cycles, during which packet P was sent.

Thus, typically, each packet's indication of a cycle comprises bit/s which toggle between, at least, 0 and 1 for packets sent in different cycles such that the bit/s is/are assigned, by the sender, as follows:

i. a first value known to the sender, receiver and supervisor, for each packet sent during each first cycle in a repeating tuple of cycles and ii. a second value, also known to the sender, receiver and supervisor, for each packet sent during each second cycle in the repeating tuple of cycles, such that the indication, on each packet P, indicates a cycle, within the repeating tuple of cycles, during which packet P was sent.

For example, the repeating tuple of cycles may comprise a pair of 2 cycles in which case, e.g. as described elsewhere herein, the indication may comprise a single bit which toggles between 0 and 1 for packets sent in sequential cycles forming a single repetition of the 2-cycle tuple, such that the single bit is assigned, by the sender, a first value known to the sender, receiver and supervisor, from among 0 and 1, for each packet sent during each odd-numbered cycle, and a second value, from among 0 and 1, which is known to the sender, receiver and supervisor, for each packet sent during an even-numbered cycle. This ensures that the indication of the cycle, on each packet P, indicates whether packet P was sent during an odd-numbered cycle or during an even-numbered cycle.

To give another example, if the indication of the cycle includes 2 bits, then 00 might indicate that the packet belongs to a first cycle in a repeating tuple of, say, 4 cycles, 01 might indicate that the packet belongs to the second cycle in the 4-cycle tuple, and 10 and 11 might respectively indicate that the packet belongs to the third and fourth (last) cycles in the tuple.

A general loss telemetry method ("method L") may include the following operations A-G, or subsets thereof, suitably ordered e.g., in alphabetical order. It is appreciated that off-the-shelf Nvidia capabilities may be used to perform operations A-G such as, for example, the NVIDIA Spectrum Ethernet Switch product family.

Coloring and counting operations B, C and E may be performed by a Match-Action-Engine which may apply a policy's action/s to a packet each time the packet is matched to that policy.

Reporting operations D and F may, as stated, be performed by a FW process.

Software may be configured to be invoked every cycle at a given point in time e.g., in halfway through (the midpoint of) the cycle, to measure and reset the relevant counter, and send the data that was measured to the supervisor.

Operation G may be performed by pure software, written in any suitable language such as, by way of non-limiting example, C, C++, Rust, or Go.

According to one embodiment, operations A-G may be implemented with attention to revision 0.40 of the Programmer's Reference Manual (PRM) for Mellanox's ConnectX®-4 and ConnectX®-4 Lx adapters, which is available online at the following link: network.nvidia.com/sites/default/files/pdf/user_manuals/Ethernet_Adapters_Programming_Manual.pdf. For example, for Operation A, a match may be defined in accordance with section 7.11.2.1. For Operation B—coloring can be considered as a modification of flow, e.g. as described in section 7.11.3.7. In Operation C, allocation of a flow counter may be implemented as described in the PRM's section 7.11.3.5. In Operations D and F, the reporting, by Sender and by Receiver respectively, may be implemented by using HW/FW to alert an SDK which can configure a relevant link toward the supervisor and send data packets periodically. In Operation E, flow counter allocation may be implemented e.g. as described in section 7.11.3.5. Regarding Operation G, a CPU with Networking capabilities may be programmed to perform this operation. The CPU may be configured to expect data packets from 2 nodes, to periodically compare the payload between the two nodes and to decide if any drop has occurred e.g. according to mismatch between sender and receiver reports.

It is appreciated however, that Mellanox's ConnectX®-4 family is merely a non-limiting example of a high-performance and low-latency Ethernet and InfiniBand adapter.

Operations A-G are now described in detail, according to certain embodiments:

Operation A. All nodes (sender/s, receiver/s and supervisor/s) typically know length of cycle (e.g., 4 or S seconds) and/or location of the coloring and/or "distinguish" bits described herein within the header, and are synchronized in time.

This defines a first cycle whose duration, as indicated by a time-stamp borne by the first cycle, is seconds 0-4 or more generally 0-S, a second cycle whose duration, as indicated by a time-stamp borne by the second cycle, is seconds 4-8 or more generally S-2S seconds, a third cycle whose duration as indicated by a time-stamp borne by the third cycle, is seconds 8-12, or more generally 2S-3S seconds, and so forth. It is appreciated that, for simplicity, all cycles are typically of equal duration (e.g., 4 seconds), however, if desired, some cycles may be longer than others (e.g., cycles' lengths may alternate between 4 seconds and 5 seconds (say, all odd-numbered cycles are 4 seconds long and all even-numbered cycles are 5 seconds long), in which case this would be known to all nodes.

Operation A typically includes configuration of a Match-Action-Engine in HW, and of a FW process which may handle the reporting (e.g. as per operation D) to the supervisor.

Operation B. COLORING BY SENDER—sender sends at least one flow of packets via a link (say: over VLAN number 4) to the receiver, adding (at least) a single bit to each packet's header; the bit is set (e.g. by sender's internal hardware/firmware) to zero (say) in the header of each packet sent during an odd-numbered cycle and the bit is set (e.g. by sender's internal hardware/firmware) to one (say) in the header of each packet sent during an even-numbered cycle. More generally, the bit is set (aka colored or painted) to be indicative of the cycle during which the packet was sent, e.g. by toggling between 0 and 1 for packets sent in sequential cycles.

Typically, the policy engine paints the bit indicative of the cycle to which the packet belongs, for every packet that belongs to the measured flow. The configuration is typically once via the match-action-engine, and, henceforth, every packet is checked to determine if the packet matches or belongs to the flow being measured, and, if so, the packet's bit is colored to indicate the cycle (e.g. odd or even) to which the packet belongs.

Operation C. COUNTING BY SENDER—2 counters are provided to the sender per flow, the first to count all bits with zero values for a given flow over the sender-receiver link, and another to count all bits with values of one, for that flow over that link.

Operation D. REPORTING BY SENDER—once (typically) per cycle (e.g., half-way through the cycle, say at second 2 if each cycle is 4 seconds long), the sender informs the supervisor how many bits were counted in the previous cycle (which indicates how many packets were sent) and then zeroes the counter that counted bits in the previous cycle. For example, during the eighth cycle, in which packets being sent may bear bits whose value is one, the sender may inform the supervisor how many zero-bits were counted by the first counter in the seventh cycle, and may then zero the first counter that counted (zero) bits in the seventh cycle, rendering that first counter ready to count zero bits in the ninth cycle. Then, during the ninth cycle, in which packets being sent bear bits whose value is zero, the sender (while using the zeroed first counter to count (zero) bits), also informs the supervisor how many one-bits were counted by the second counter in the eighth cycle, and then zeroes the second counter that counted one-bits in the eighth cycle, thereby rendering the second counter ready and waiting to count one-bits in the upcoming ($10^{th}$) cycle.

It is appreciated that the sender may inform the supervisor how many bits were counted in a given cycle at a suitable point in time, not necessarily half-way through the next cycle n+1. For example, e.g. if it is indeterminate how late some packets might be, the supervisor may be informed how many bits were counted in cycle n, toward the end of cycle n+1, such as seven-eights of the way through cycle n+1 or 90% of the way through cycle n+1. On the other hand, once the supervisor has been informed, the counters are typically readied for the next cycle (e.g. the counters are typically read from and only then reset) such that the point of time is typically selected to ensure that sufficient time is available, subsequent to the point in time and before the end of the cycle, to ready (e.g. reset) the counter for the next cycle.

The sender (or receiver, below) may inform the supervisor how many bits were counted in a cycle C at a suitable point in time, typically after cycle C terminates, such as but not limited to half-way, or more, through cycle C+1.

Operation E. COUNTING BY RECEIVER—receiver receives all (or less than all) of the sequence of packets via the link. Two counters are provided to the receiver per flow, the first to count (for a specific flow) all bits with zero values, and the second to count all bits with values of one. Typically, the receiver uses the first counter to count all bits with zero values, even those which arrived after the cycle, whose packets were colored with zero, has terminated.

Operation F. REPORTING BY RECEIVER—(At least) once per cycle (e.g., half-way through the cycle, say at second 2 if each cycle is 4 seconds long), the receiver informs the supervisor how many bits were counted in packets the receiver has received, to date, and then zeroes the counter that counted bits in the previous cycle.

Typically, even if the bit indicative of cycle C is zero, and a packet bearing a zero-bit is received during cycle C+1, the receiver still increments its first counter when this packet is received, thereby to allow arrival of packets sent during cycle C but received late, in cycle C+1, to be properly reported, so long as they arrive before the counter is reported to the supervisor and zeroed.

According to one embodiment, senders and receivers inform the supervisor of the state of the counter corresponding to a given cycle (and zero the counter) at the same time-point within the next cycle. Alternatively, senders may inform the supervisor after, say, ¼ cycle, at t=1 sec, whereas receivers may inform the supervisor after, say, ¾ cycle, at t=3 sec, or, more generally, senders and receivers may inform the supervisor of the state of the counter corresponding to a given cycle (and zero the counter) at different time-points within the next cycle. However, in the latter case, a mechanism is typically provided to allow the supervisor to match data arriving from the sender and from the receiver, given that in this alternative embodiment, sender and receiver are not correlated, and absent such a mechanism, the supervisor could confuse sender data from cycle x and receiver data from cycle x+1.

Operation G. COMPARING BY SUPERVISOR—the supervisor receives time-stamped indications, from the sender, of how many bits were counted in packets the sender sent, as well as time-stamped indications, from the receiver, of how many bits were counted in packets the receiver received.

If an indication from the sender was followed, delta seconds later by an indication from the receiver, these two indications may be assumed to pertain to the same cycle, namely the cycle previous to the timestamp. If the two indications are equal, this indicates no packet loss. If the two indications are non-equal e.g., if the receiver reports less bits than the sender does, this indicates that the flow to which the counters pertained, has dropped packets, and the difference between the number of bits sent and the number received, indicates how many packets were dropped by this flow.

According to a variation, the sender and/or receiver do not report to the supervisor "on the fly" (e.g., do not report packets sent or received in cycle C, during cycle C+1) and, instead, the sender and/or receiver report packets sent or received in each cycle C only later, e.g., in batches.

It is appreciated that Method L may provide loss telemetry for plural flows, rather than for a single flow. In this case, data (e.g., values on counters from the previous cycle) is sent from all senders and receivers to the supervisor once per cycle. Typically, the number of senders and receivers is equal, and senders and receivers are divided into couples, each having a unique identifier (e.g., string of bits) known to sender, to receiver, and to supervisor.

If there are plural flows between X senders/receivers without any differences in headers, more bits may be used in the header of the packets, e.g. y bits where y to the power of 2 is at least X. Also, in this case, typically per flow, sender and receiver agree between them regarding a pattern of distinguishing bits per flow and their corresponding identifier. This may be configured by a policy on the Match-Action engine, by creating suitable matching rules. The agreed upon pattern may for example include any set of n bits in the packet header such as, say, the 2 (or less or more) first (or last) bits of (say) the VLAN id of the VLAN header. If a packet with the agreed upon header bits is, then, detected on a configured port, a suitable matching rule may then be invoked, such as the following rule: "On invocation, increment HW counter".

It is appreciated that the sender/receiver typically informs the supervisor to which flow (from among plural, say 20, flows travelling over the link between sender and receiver) a given number of bits pertains.

Typically, each flow has a unique identifier (e.g., string/array of bits) known to both sender and receiver (per flow e.g.). Data may be sent between the sender or receiver to their supervisor in tuples where each tuple may comprise flow identifier and sender/receiver value of counter.

Typically, the supervisor knows the length of a cycle (as do the receiver and/or the sender). The supervisor also knows the average delay (propagation time in the network).

The maximum possible delay may be computed as x*avg—propagation-time. Typically, the cycle time (duration) is selected to be larger than this value.

An improved telemetry system which may implement method L is now described in detail. FIG. 1 is a simplified top-level block diagram illustration of the system, which may include a sender, receiver and supervisor; the sender and receiver may comprise routers, and the supervisor may, for example, be based on an X86 family microprocessor and may include a user interface which enables a network administrator to select any flow (or any sender-receiver pair in the network being administered) for tracking, and, responsively, to receive packet loss data regarding that flow. The system itself may be implemented on a NVIDIA® Mellanox® Spectrum®—2 Ethernet switch, which includes software development tools and open APIs. For simplicity, the topology for a given (single e.g.) flow is shown.

A diagram of a SwitchX-2 which includes a policy engine, is available online, e.g., here: network.nvidia.com/sites/default/files/doc-2020/switchx-2-en-sdn.pdf.

Typically, each sender adds to each packet an indication (a) of a cycle, from among the cycles, during which the packet was sent (cycle bit/s), and an indication (b) of whether or not the packet belongs to a given flow for which packet drops are to be counted e.g., to enable the sender and receiver to acknowledge a specific flow (distinguish bit/s). According to some embodiments, each indication comprises a single bit added by the sender to the packet's header. Or, there may be plural cycle bits, and/or plural distinguish bit/s.

Indication (b), the distinguish bit/s, allows each sender and receiver to acknowledge a specific given flow. For all packets which belong to the specific given flow (e.g., between sender and receiver), the indication (b) bit may be set, say, to '1', whereas for all packets which do not belong to the specific given flow, the bit may be set to '0'. When indication (b) bit is not provided, packets that are colored (in an alternating manner) may have a native identifier (e.g., ingress and egress port, VLAN tag, etc.). When indication (b) bit is provided, no native identifier need be provided, which adds flexibility. Providing the indication (b) bit increases resolution, since a user e.g., supervisor, may choose only a portion of the packets to be monitored by packet drop, selecting packets to be monitored by selecting what the identifier (b) bit should be.

If a single node acts as both sender and receiver, e.g., switch connected via wire to itself, another 2 nodes may be added, to serve as sender and receiver respectively.

According to certain embodiments, at least one sender or at least one receiver (typically each sender and/or each receiver) include a policy engine and counters HW e.g., as described in detail herein.

The policy engine may be employed to define a flow and/or to "paint" a bit in a packet's header, to indicate a cycle to which the packet belongs, using "policies" which may be defined or configured e.g., as described in the following online cisco.com/c/en/us/support/docs/ip/generic-routing-encapsulation—reference: gre/8014-acl-wp.html, and/or as described elsewhere herein. The policy engine or Match-Action-Engine is typically configured as part of general initialization of the system.

Counters typically comprises HW components which are the ASIC. Each HW counter has 3 options: increase by 1, read, and reset to zero. Conventional counters are described in the Wikipedia entry entitled "Hardware performance counter". Typically, each counter has a name or unique identifier. A Global Accounting HW unit (e.g. as described elsewhere herein) may provide the HW counter functionality.

Typically, policies, configured using the sender/receiver's respective policy engines, trigger the counters in an alternating manner, according to the cycle on the sender and to the color on the receiver.

The policy configured (typically during system initialization) is then triggered by matching a different rule to each packet (at the sender end—by time; at the receiver end—by color). At both ends (sender and receiver), the policy engine's action is to increase one of the 2 counters each side (sender and receiver) holds.

Each policy includes a Match portion or component, and an Action portion or component. Once a policy has been configured, each packet P may undergo a process to check whether or not packet P matches the Match portion of any of the configured policies. If so, the corresponding Action portion of the policy matched to packet P, is then applied to packet P. An example, for a single distinguish bit, and a single cycle/coloring bit including Rule-based HW Configurations for sender and for receiver, is described elsewhere herein.

The hardware of the sender and of the receiver may, according to an embodiment, be configured to include all or a subset of the following functionalities I-V:

I. Sender/receiver's packet buffer accepts packet which has arrived
II. Sender's (or receiver's) DCI identifies whether or not packet header is related to, or relevant to, or associated with, a flow for which packet loss telemetry is desired (e.g., as selected, via a suitable user interface, by a network administrator).
III. Sender's (or receiver's) Global Accounting HW unit increments flow counters e.g. as described above with reference to operation C and/or operation F.
IV. Sender's DCM colors bit/s in the packet's header e.g., as described above with reference to operation B (typically only a single bit is added to the header, to identify whether each packet that has arrived at the sender (or receiver), belongs to an odd-numbered or even-numbered cycle, depending on whether the bit's "color" is 0 or 1).
V. Transmission of the packet.

In the sender, all of hardware functionalities I-V are typically utilized, e.g., to implement method L, whereas, typically, in the receiver, hardware functionalities I-III and V, but not the coloring hardware functionality IV, are utilized.

Figure 2:
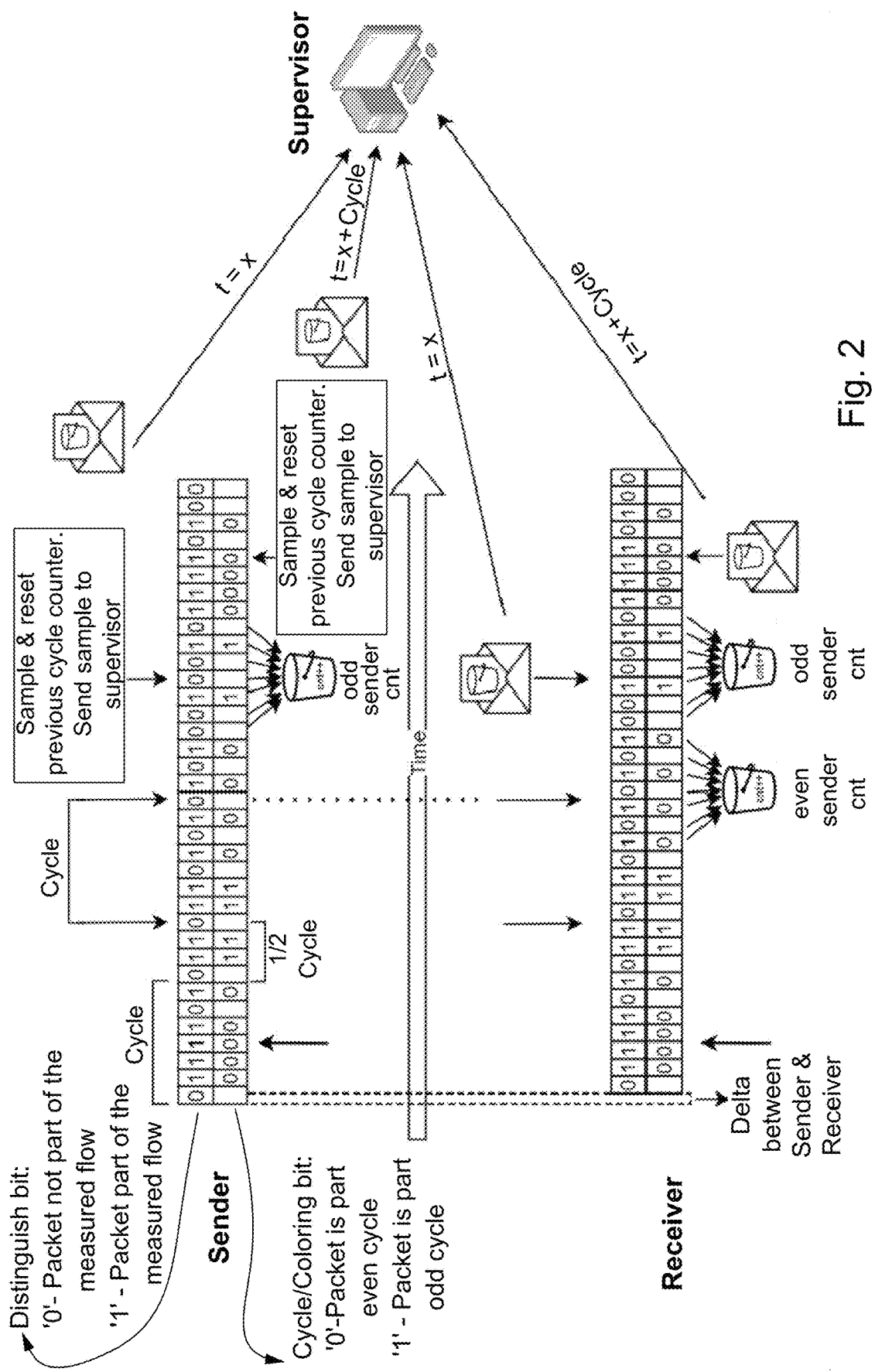
FIG. 2 is a pictorial illustration of an example timeline of a first example method of operation in which each packet includes, e.g. in its header, both a "coloring" bit whose value (0 or 1) indicates whether the packet belongs to an even or odd cycle, and a "distinguish" bit whose value (0 or 1) indicates whether or not the packet is part of a flow being measured (e.g. a flow for which telemetry data is being collected).
Figure 4:
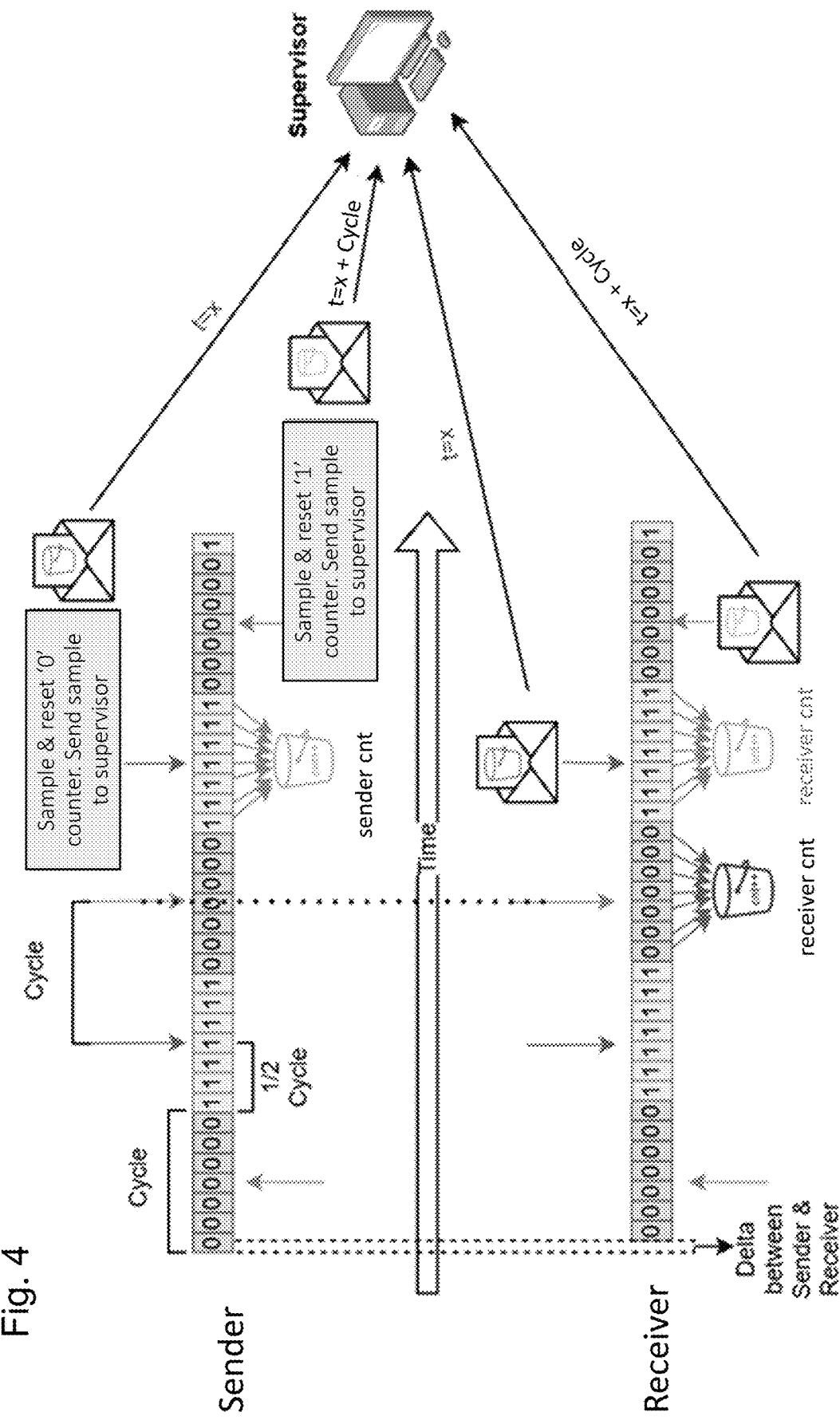
FIG. 4 is a pictorial illustration of an example 2-cycle timeline according to a second example method of operation which may be used in conjunction with any of the embodiments shown and illustrated herein.

FIG. 2 is a pictorial illustration of an example timeline of a first example method of operation which may be used in conjunction with any of the embodiments shown and illustrated herein. As shown, in this embodiment, both a distinguish bit and a cycle coloring bit (aka color bit, coloring bit, cycle bit) are employed, in contrast to FIG. 4 presented below, in which only a cycle coloring bit is provided. It is appreciated that in various contexts herein, a coloring bit (singular) is described, however, alternatively, more than one coloring bit may be provided, if it is desired to provide more cycles, as described elsewhere herein. Similarly, references herein to a distinguish bit (singular) may alternatively be replaced by references to more than one distinguish bit, to enable splitting a flow into more sub-flows than is possible with a single distinguish bit.

Figure 3:
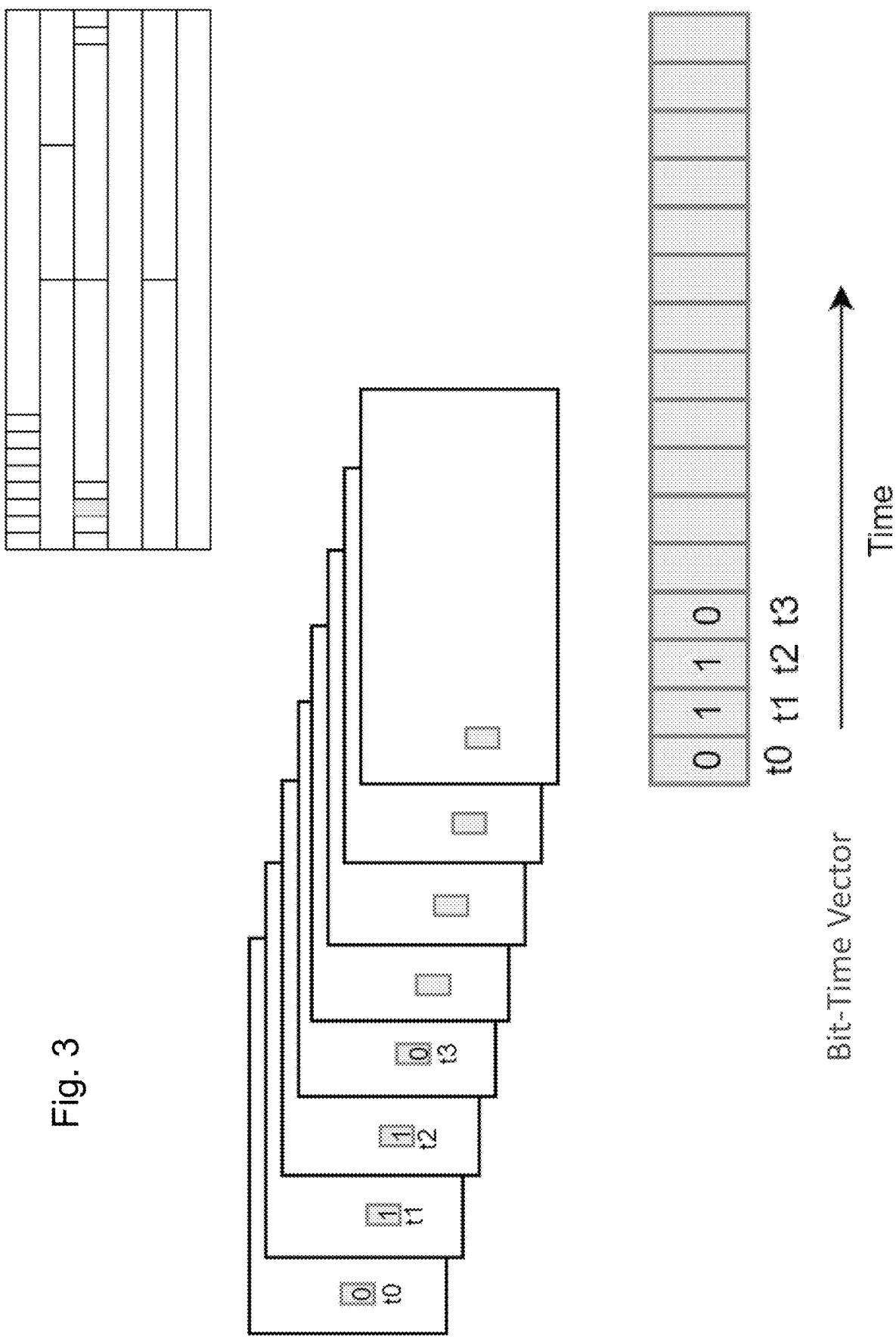
FIG. 3 is a simplified pictorial illustration of an embodiment, which may be provided in conjunction with any of the embodiments shown and illustrated herein, in which only a single bit (shown shaded) is added to the header.

FIG. 3 is a simplified pictorial illustration of an embodiment in which only a single bit (shown shaded) is added to the header, to identify whether each packet that has arrived at the sender (or receiver) belongs to an odd-numbered or even-numbered cycle, depending on whether the bit's "color" is 0 or 1. As shown, the single bit assumes the value of either 0 or 1, in each of a sequence of packets which a given sender sends to a given receiver, at times t0, t1, t2, . . . respectively. In FIG. 3, the top rectangle and series of rectangles in the middle each correspond to headers of packets sent at times t0, t1, . . . . The vector of values assumed by the bit at times t0, t1, t2, . . . etc., shown in FIG. 3 as a shaded 1-dimensional array, is termed a "bit-time vector".

The vector is finite for a flow which is finite, whereas if the flow is infinite, the vector is infinite, and what is shown in FIGS. 3 and 4 is a snippet of that infinite vector (or of a vector too long to be shown, if the flow is very long). The vector bits need not be saved in the sender and receiver; after processing the bit (coloring and counting on the sender, or just counting on the receiver), the data is typically discarded, rather than being saved.

Typically, a packet's time of arrival may be used by a sender, to decide when a cycle starts and ends. For example, cycle resolution may be selected to be a power of 2 by choosing the relevant bit on the packet's entrance to the switch (sender) Time Stamp (TS). For example, for 32 second (2 exp 5) cycles consider the 6th LSB bit of the TS. The receiver typically knows whether a packet is relevant according to the distinguish bit (rather than by time) and knows to which counter (cycle) the packet belongs according to the coloring bit/bits, which were colored by the sender.

In the illustrated embodiment, a single bit is provided for the headers of the packet, as described elsewhere herein, however this is not intended to be limiting; instead, 2 or B bits may be provided per packet header, in which case instead of the single vector shown at the bottom of FIG. 3, two or B vectors, respectively, may be received.

FIG. 4 is a pictorial illustration of an example 2-cycle timeline which may be followed by a given sender, receiver and supervisor such as the sender, receiver, and supervisor of FIG. 1. In FIG. 4, counters and arrows shown in faded font pertain to one cycle, whereas counters and arrows shown in ordinary, non-faded font, pertain to another cycle.

As shown, plural counters count occurrences of each of the plural values of the bit/s added to the header. Thus, in the single-bit embodiment, 2 counters may be provided in the sender (and, similarly, two in the receiver), a '0' counter to count occurrences in which the single bit's value was zero, and a '1' counter to count occurrences in which the single bit's value was one. It is appreciated that there need not be sequences of 0's and of 1's of equal length (e.g. of length 7 bits) in the bit-time vector and this is merely exemplary, since it is not generally or always the case that the same number of packets is sent in each of the cycles (in practice, a large number of packets might be sent in one cycle, and no (zero) packets might be sent in the next cycle; the half/cycle interval between the defined full cycles is also merely exemplary. The arrows, labelled t=x or t=x+cycle, indicate the times at which the two counters are sent to the supervisor, by the sender or by the receiver.

Numerical example: the sender may sample its '0' cycle counter, and send the value "1000" to the supervisor, whereas the receiver may sample its '0' cycle counter, and send the value "990" to the supervisor. The supervisor may compute that the loss (for a half cycle e.g.) is 0.1%.

In all embodiments herein, each cycle may have a suitable length or duration, such as 4 seconds.

The Policy Engine Component (aka "Policy Engine" aka "Match-Action engine" aka "Match & Action engine") of the sender/s and/or receiver/s of FIG. 1 is now described in detail, according to certain embodiments.

It is appreciated that policy engines are known in the art, e.g. in this online reference:cisco.com/en/US/docs/cable/serv_exch/serv_control/broadband_app/rel 315/bbrg/01_SCA_BB_RG_3.1.5.pdf which describes packets which "bypass the policy engine".

Figure 5:
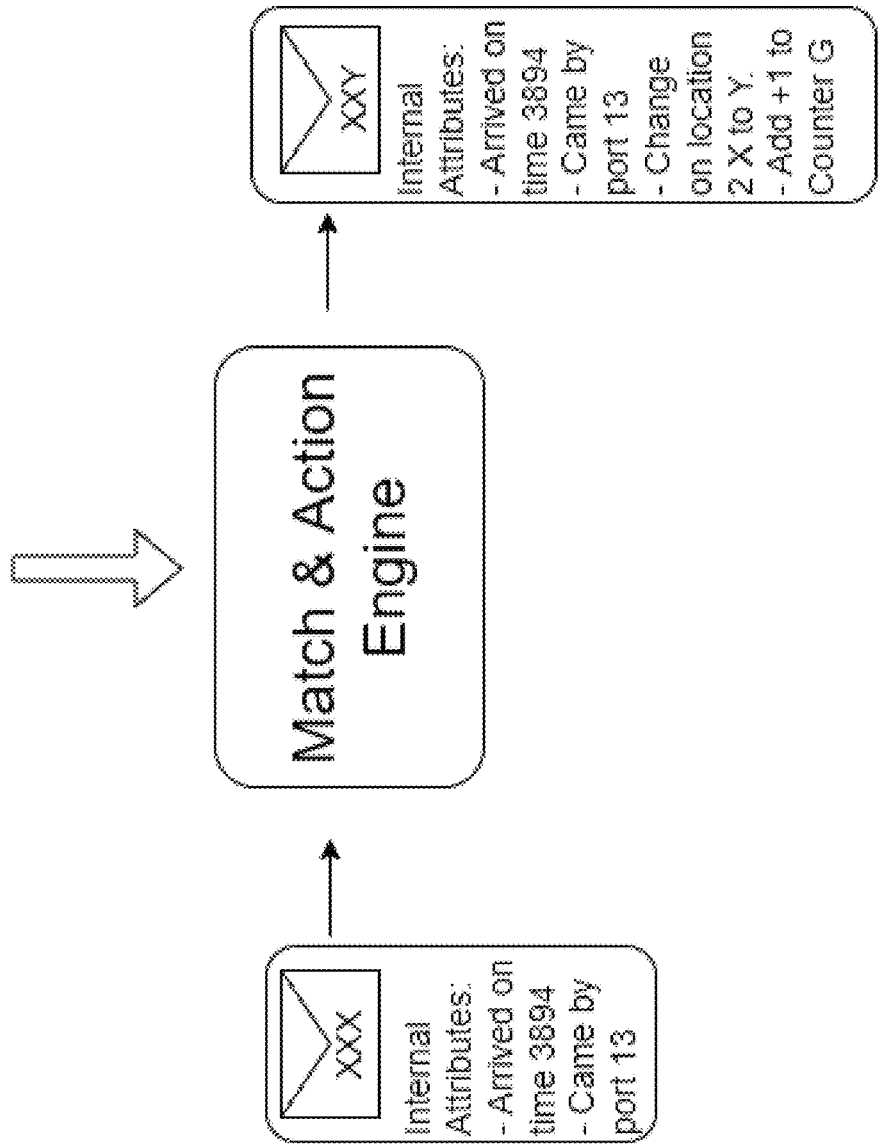
FIG. 5 is a diagram of an example policy engine or Match-Action-Engine useful in conjunction with any of the embodiments of FIGS. 1-4.

An example policy engine is shown in FIG. 5. In FIG. 5, "locations" may be expressed in terms of offset in the packet's header. "Attribute" refers to packet attributes e.g. data (e.g., the packet's time of arrival at the receiver, aka arrival timestamp) which may be in connection to the packet, but was not originated by the sender. The term "internal" refers to an attribute which, like the arrival timestamp, only the switch can create. Depending on the protocol, the switch may use such an attribute and/or may send as information to others.

The engine typically compares an attribute of a package arriving at the engine, to a value or threshold, defined by various (rule, action) tuples in the engine.

Typically, the comparison effected by the engine is only to, or according to the rule. If (e.g. iff) a match is found for the packet, the action will be applied (e.g. the action of "change the bit at offset 6 on the packet header to '1'"). The most basic action is to do nothing (e.g., to pass to the next rule). Another example action is to drop or discard the packet. Yet another example action is receiving an offset and value, and changing the packet header, at that offset, to that value. Thus, whereas conventional ACL (Access Control list, which has been a base for Match-Action-Engines for decades) had only 2 actions, either discard or let pass, this is not intended to be limiting.

Typically, there are plural (rule, action) tuples in the engine and a suitable priority mechanism may determine which (rule, action) tuple the engine will use for a given incoming or arriving packet. Typically, the engine typically has a priority determining which rules of {rules, action} tuples to perform, and in which order.

As shown:

The engine includes {Rule, Action] tuples where each Rule typically comprises a {location, value} tuple. Each rule filters packets and applies its action/s on packets to which the rule is relevant. For example, if the user seeks to discard a packet that arrived with SMAC=xyz value, the rule's "location" is the offset of the SMAC field on the packet's header, the value to compare is xyz, and the action coupled to the rule is "discard".

It is appreciated that provision of a {Rule, Action} tuple ensures that, if a given rule matches, the action coupled to the given rule by the tuple, is applied. Typically, however, the rule itself also includes a tuple ({location/offset in the packet, new value to change}).

In contrast, the tuples which, per sender and receiver, are sent once every cycle, may have three components: the value of the bucket counting packets in the previous cycle, an indication of "role" e.g., whether this tuple is arriving from sender or from receiver, and a flow identifier aka "Who am I" or flow ID.

EXAMPLE

An incoming packet XXX may have the following internal attributes:

Arrived at time 3894

Came by (e.g., arrived from) port 13

The outcoming packet XXY may have the following internal attributes:

Arrived on time 3894

Came by port 13

At location 2 (e.g. offset 2 on the packet's header), change X to Y (example of an action in which the value of X is changed or edited to Y).

Add +1 to a Counter ("counter G").

A description of a match-action-based hardware architecture is available online here: researchgate.net/publication/338926337_P4_to_FPGA_-_A_Fast_Approach_for_Generating_Efficient_Network_Processors.

Match-action policies may also be provided in accordance with those policies, and matches and actions are described in the following online reference: ciscolive.com/c/dam/r/ciscolive/us/docs/2020/pdf/DGTL-BRKRST-2791.pdf.

It is appreciated that a given packet that enters the engine, may or may not be modified or changed, depending on the content of the packet, and on how the engine was configured. The change may be, but is not necessarily, applied to the content of the packet or a section or portion thereof, such as the coloring bit in the packet's heading whose value may be changed, e.g., if the engine has rules on the IP (Internet Protocol) section of the packet's header. The engine may also affect the handling of the packet e.g., may choose a destination address (or egress port) for the packet, and/or increase the value of an internal HW counter.

A Match & Action Engine aka policy engine may be configured to have only a specific purpose e.g., may be configured to parse and match values to, say, an IP portion (header section related to IP) in the packet's header only.

A description of types of Access Control List (ACL) entries and what happens when different kinds of packets encounter these various entries, is available online here: cisco.com/c/en/us/support/docs/ip/generic-routing-encapsulation-gre/8014-acl-wp.html.

An example match-action-engine is described in the following online reference ciscolive.com/c/dam/r/ciscolive/us/docs/2020/pdf/DGTL-BRKRST-2791.pdf (see e.g. slide 16).

cisco.com/c/en/us/support/docs/ip/generic-routing-encapsulation-gre/8014-acl-wp.html is an online reference which pertains to a match-action-engine in which the actions comprise (as in FIG. 5 herein) permitting a packet to pass via the switch vs. denying the packet's passage (and instead, discarding the packet), but "permit" and "deny" are merely non-limiting examples of possible actions.

It is appreciated that ACLs (access control lists), rather than the Match-Action/Policy engines described elsewhere herein, may be used to block IP packets from being forwarded by a router, for example. However, this is not intended to be limiting, since, alternatively, an action may be more complex.

Method L (including all or a subset of operations A-G, suitably ordered) may be based on the following online publication deepai.org/publication/time-multiplexed-parsing-in-marking-based-network-telemetry. An extra bit ("distinguish bit") may, e.g., as described herein, be provided to distinguish between flows.

From a HW configuration and a FW perspective, Method L may include all or a subset of the following operations (it is appreciated that certain assumptions, which are not intended to be limiting, have been made for simplicity, as described elsewhere herein, for example, that certain bit values are associated with odd and even cycles respectively):

Algorithm Operation a: Flexibility in the Algorithm:
  Choose the bit on the Headers of the packet e.g., 2 bits from the QoS bits of the IP header.
    Choose cycle resolution.
    The cycle may be chosen to be a power of 2 by choosing the relevant bit on the packet's entrance to the switch Time Stamp (TS).
    For example, for 32 seconds cycles, consider the 6th LSB (least significant bit) of the switch Time Stamp.
Algorithm Operation b: Configure Sender HW
  Allocate 2 HW counters.
  Configure the match-action-engine to include the following sets of rule/s and action/s.
Rule to Match 1:
  Location: The location of the "distinguish" bit/s i.e. the bit/s which distinguish/es between cycle/s (e.g. offset of such bit/s in the packet's header)
  Value: bit is '1'.
Rule to Match 2:
  Location: TS (Timestamp) of the arriving packet to the switch relevant bit.
  Value: bit is '0'.
  Action 1: Increase the even cycle HW counter by 1.
  Action 2: Color the chosen bit in packet's header to '0'
  Rule to Match 1: The location to the bit that distinguish the flow.
  Location: The location of the bit that distinguish the flow.
  Value: bit is '1'
Rule to Match 2:
  Location: TS (Timestamp) of the arriving packet to the switch relevant bit.
  Value: bit is '1'.
  Action 1: Increase the odd cycle HW counter by 1.
  Action 2: Color the chosen bit in packet's header to '1'.
Algorithm Operation c: Configure Receiver HW:
  Allocate 2 HW counters.
  Configure the match-action-engine
Rule to Match 1:
  Location: The location of the bit that distinguish the flow.
  Value: bit is '1'.
Rule to Match 2:
  Location: The location of the color bit that distinguish for odd cycle.
  Value: bit is '0'.
  Action 1: Increase the even counter by 1.
Rule to Match 1:
  Location: The location of the "distinguish" bit/s that distinguish/es the flow.
  Value: bit is '1'.
Rule to Match 2:
  Location: The location of the color bit that indicates odd cycle.
  Value: bit is '1'.
  Action 1: Increase the odd counter by 1
Algorithm Operation d: FW Process:
  Invoke every cycle, e.g., in the middle of the cycle.
  Report value of previous cycle's counter and reset that counter.

There are cases where, in order for the receiver counter to be able to count per "flow", there is a need for additional bit in the packet header e.g., two bits instead of just one. Those cases are when the ability to identify the flow resides in the sender side. For example: the flow definition is packets received on a specific port at the sender's switch, while there are additional ports receiving the same packets, and all of those packets are transmitted to the receiver's switch at a specific port. The additional bit assignment will indicate that those packets are to be counted on both sender and receiver sides.

It is appreciated that packet loss information provided herein may be presented to a user of a supervisor node and/or may trigger some other system or component to automatically respond, in a useful way, to packet loss information this invention might provide. Optionally, a supervisor may alert a network manager when packet loss (e.g., answering to certain criteria) is detected. And/or, for debugging purposes, given X flows received on a port where packets are dropped, any method shown and described herein may be applied on each of the flows to determine which of the flows experience the packet drops.

Typically, the message sent by each sender and receiver to the supervisor, each cycle, includes not only a value of a counter, but also, an identifier of the flow with which the counter is associated, and/or an indicator of whether the sending entity's role is that of sender or of receiver.

Typically, the supervisor is configured to match the arrival time of the packet with the sender and receiver pair having the same flow identifier.

For example, it may be found that malfunctioning of a given port is causing a flow associated with that port to experience more packet drops than flows associated with other ports which are not malfunctioning, or to experience more packet drops than the same port experienced in the past (e.g., when the same port was not yet malfunctioning).

Alternatively, or in addition, packet loss information provided herein may be utilized for:
  a. Isolation of network problems to facilitate remote diagnostics and/or troubleshooting.
  b. Ensuring that a given network service meets one, some, or all guarantees given to the networks' customers, say, in service-level agreements (SLA) between the network operator and the network's "customers" or users, such as guarantee/s of a given level of latency or guarantee/s of a given level of reliability.
  c. Providing inputs for traffic engineering in which a network operator steers traffic or selects paths to carry traffic flows, rather than relying on the automatic selection of paths, by routing protocols which may be employed in the network. Path selection or steering may optimize use of network resources, and/or may reduce network node failures, and/or may reduce network link failures, and/or may ensure given customers receive given e.g., pre-arranged service levels. Packet loss data, generated as described herein, may serve as an input for traffic engineering e.g., as an input based on which a decision may be made, by the network operator, to change the physical configuration of the network and/or to change the logical configuration thereof.

d. Providing input for periodic or continuous assessment of health of a live network e.g., by cable companies, testers and 3PL companies, to prevent an under-performing network from hampering business processes and operations, or reducing business productivity. Packet loss data generated as described herein may serve as an input for estimating network bandwidth and/or throughput and/or quality of performance vs. malfunctioning of individual network device (modems or routers, for e.g.) and/or network noise and/or network congestion (e.g., to reduce re-transmission of data packets, which worsens network congestion), and/or to determine whether to change a current network configuration by data prioritization and/or by setting suitable data encryption and/or load balancing configurations.

Example: The senders and receivers each comprise any device having a layer 2 or layer 3 end-to-end connection which provides networking services, perhaps among other services, such as, by way of non-limiting example, a GPU or NIC. Plural layer 3 (say) flows are running on a certain port, and there is packet drop from one of these flows. The method of the present invention may be applied to each of the flows to determine which of them is responsible for the packet loss. Once it is known that, say, the fifth flow from among, say, 10 layer 3 flows running on the port, is the one which dropped packet/s, a "fatal" or "exception" determination may be made, regarding that flow. If the supervisor has a network operating system, an alert may be generated, e.g., for a human network manager. Diagnostics may be made accordingly, e.g., it may turn out that packet drops are occurring in flows sent by a given entity, and not in flows sent by other entities.

It is appreciated that embodiments of the invention are widely applicable to, inter alia, switches, network adapters, and fields including but not limited to networking including cellular Networking, Clocking & Network Synchronization, and congestion control. Embodiments of the invention may, for example, be incorporated into NBU Network Devices such as IB/ETH switches and NICs (network interface controllers). The term "NetBackup (aka NBU)" as used herein is intended to include any client-server software solution whose core product functionality includes backup/recovery, archive/retrieval, and disaster recovery.

It is appreciated that WJH techniques which use port counters, cannot be specified to provide telemetry on a single data flow, whereas embodiments herein may make dynamic use of flow counters to provide telemetry on a single data flow.

The term "all" is used herein for simplicity, to describe example embodiments. It is appreciated, however, that, alternatively, whatever is said herein to be true of, or to characterize, or to pertain to, "all" members of, or "each" member of, or "every" member of, a certain set, can also, in other embodiments, be true of, or characterize, or pertain to, most, but not all members of that set, or all but a few members of that set, or at least one (but less than all) member/s of the set.

It is appreciated that software components of the present invention may, if desired, be implemented in ROM (Read Only Memory) form. The software components may, generally, be implemented in firmware or hardware, if desired, using conventional techniques. It is further appreciated that the software components may be instantiated, for example, as a computer program product, or on a tangible medium. In some cases, it may be possible to instantiate the software components as a signal interpretable by an appropriate computer, although such an instantiation may be excluded in certain embodiments of the present invention.

It is appreciated that various features of the invention which are, for clarity, described in the contexts of separate embodiments, may also be provided in combination in a single embodiment. Conversely, various features of the invention which are, for brevity, described in the context of a single embodiment, may also be provided separately, or in any suitable sub-combination.

It will be appreciated by persons skilled in the art that the present invention is not limited by what has been particularly shown and described hereinabove. Rather the scope of the invention includes, inter alia, the appended claims and equivalents thereof.

The invention claimed is:

1. A method for network monitoring, comprising:
   selecting at least one flow of packets, having respective headers, to be transmitted over a network from a sender to a receiver during a given period, from among multiple flows transmitted by the sender;
   dividing the period into intervals, which repeat cyclically during the given period;
   prior to transmitting the packets from the sender, adding to a header of each packet a set of one or more first bits indicating an interval during which the packet is to be transmitted and a single second bit indicating whether or not the packet belongs to the at least one selected flow;
   transmitting the packets over the network from the sender to the receiver while counting a respective first number of the packets transmitted in the at least one selected flow during each of the intervals;
   upon receiving the packets at the receiver, counting, responsively to the first and second bits in the respective headers, a respective second number of the packets received in the at least one selected flow in each of the intervals; and
   comparing the respective second number to the respective first number for each of the intervals to detect a loss of the packets in the at least one selected flow.

2. The method according to claim 1, wherein dividing the period into intervals comprises identifying odd intervals and even intervals occurring in alternation over the given period.

3. The method according to claim 2, wherein the set of one or more first bits consists of a single first bit having a first bit value indicating the odd intervals and a second bit value, different from the first bit value, indicating the even intervals.

4. The method according to claim 1, wherein the single second bit has a first bit value indicating that the packet belongs to the at least one selected flow and a second bit value, different from the first bit value, indicating that the packet does not belong to the at least one selected flow, and
   wherein counting the respective number comprises counting the packets received in each interval in which the single second bit has the first bit value while refraining from counting the packets in which the single second bit has the second bit value.

5. The method according to claim 1, wherein comparing the respective second number to the respective first number comprises transmitting the respective first number of the packets transmitted in the at least one selected flow during each of the intervals from the sender over the network to a supervisor, which compares the respective second number to the respective first number for each of the intervals.

6. The method according to claim 1, wherein selecting the at least one flow comprises, during a series of periods, selecting, from among the multiple flows transmitted by the sender, a different respective flow to monitor in each of the periods, and
wherein comparing the respective second number to the respective first number comprises detecting, over the series of the periods, the loss of the packets in each of the monitored flows.

7. The method according to claim 6, and comprising detecting a lossy flow among the multiple flows based on the loss of the packets in each of the monitored flows and issuing an alert with respect to the lossy flow.

8. A system for network monitoring, comprising:
a sending node, which is configured:
to receive a selection, from among multiple flows transmitted by the sending node, of at least one flow of packets, having respective headers, to be transmitted over a network from the sending node during a given period, which is divided into intervals, which repeat cyclically during the given period;
to add to a header of each packet a set of one or more first bits indicating an interval during which the packet is to be transmitted and a single second bit indicating whether or not the packet belongs to the at least one selected flow; and
to transmit the packets over the network to a receiving node while counting a respective first number of the packets transmitted in the at least one selected flow during each of the intervals;
the receiving node, which is configured to receive the packets from the network and to count, responsively to the first and second bits in the respective headers, a respective second number of the packets received in the at least one selected flow in each of the intervals; and
a supervisor node, which is coupled to compare the respective second number to the respective first number for each of the intervals to detect a loss of the packets in the at least one selected flow.

9. The system according to claim 8, wherein the intervals comprise odd intervals and even intervals occurring in alternation over the given period.

10. The system according to claim 9, wherein the set of one or more first bits consists of a single first bit having a first bit value indicating the odd intervals and a second bit value, different from the first bit value, indicating the even intervals.

11. The system according to claim 8, wherein the single second bit has a first bit value indicating that the packet belongs to the at least one selected flow and a second bit value, different from the first bit value, indicating that the packet does not belong to the at least one selected flow, and
wherein the receiving node is configured to count the packets received in each interval in which the single second bit has the first bit value while refraining from counting the packets in which the single second bit has the second bit value.

12. The system according to claim 8, wherein the sending node is configured to transmit the respective first number of the packets transmitted in the at least one selected flow during each of the intervals over the network to the supervising node.

13. The system according to claim 8, wherein the sending node is configured, during a series of periods, selecting, to receive the selection of a different respective flow to monitor in each of the periods, from among the multiple flows transmitted by the sending node and
wherein the supervising node is configured to compare the respective second number to the respective first number over the series of the periods so as to detect the loss of the packets in each of the monitored flows.

14. The system according to claim 13, wherein the supervising node is configured to detect a lossy flow among the multiple flows based on the loss of the packets in each of the monitored flows, and to issue an alert with respect to the lossy flow.

* * * * *